March 29, 1955     O. R. DECKERT     2,704,858
MEAT TENDERIZING MACHINE WITH COACTING ROLLS
Filed Nov. 24, 1948     5 Sheets-Sheet 1

INVENTOR.
O. Robert Deckert
BY

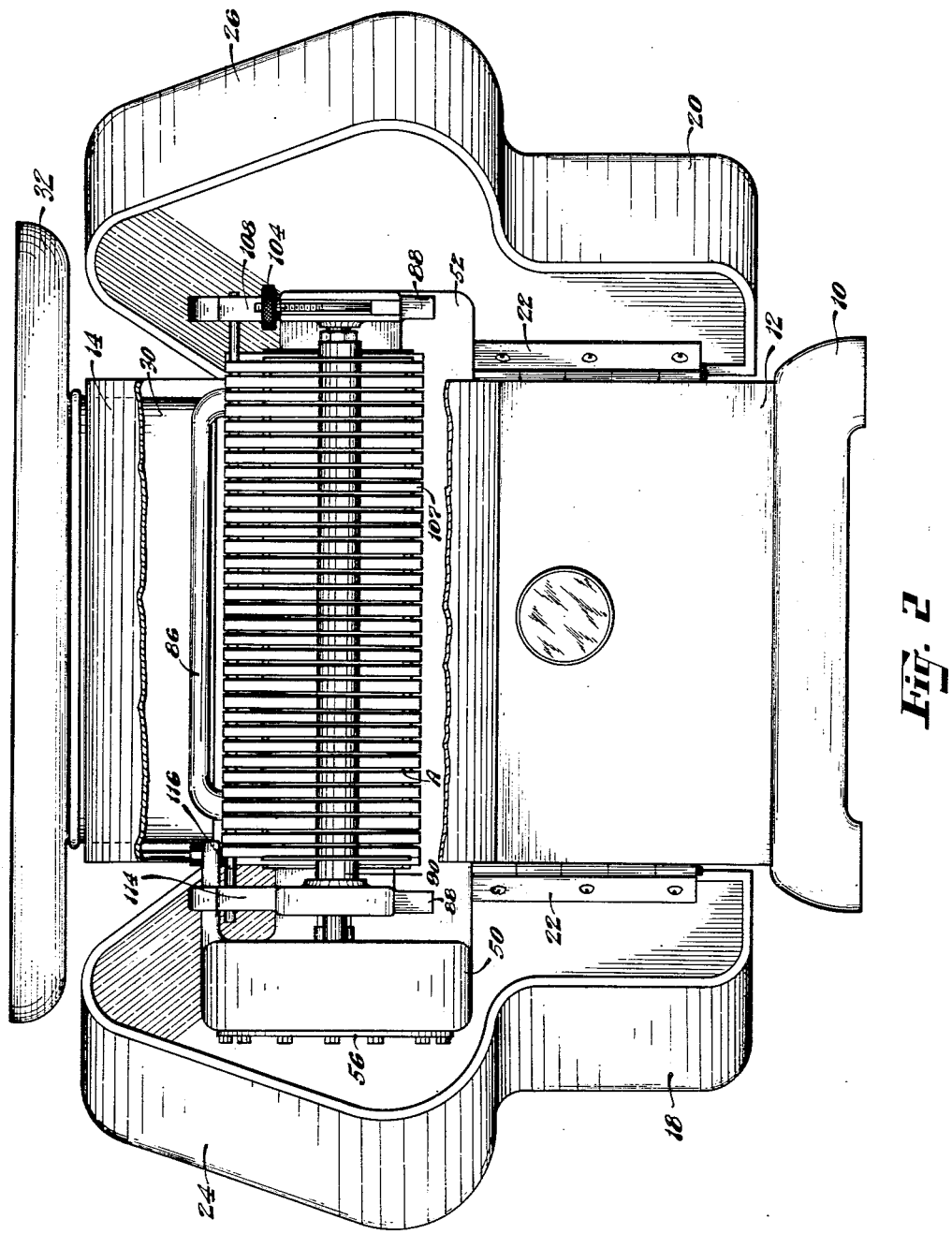

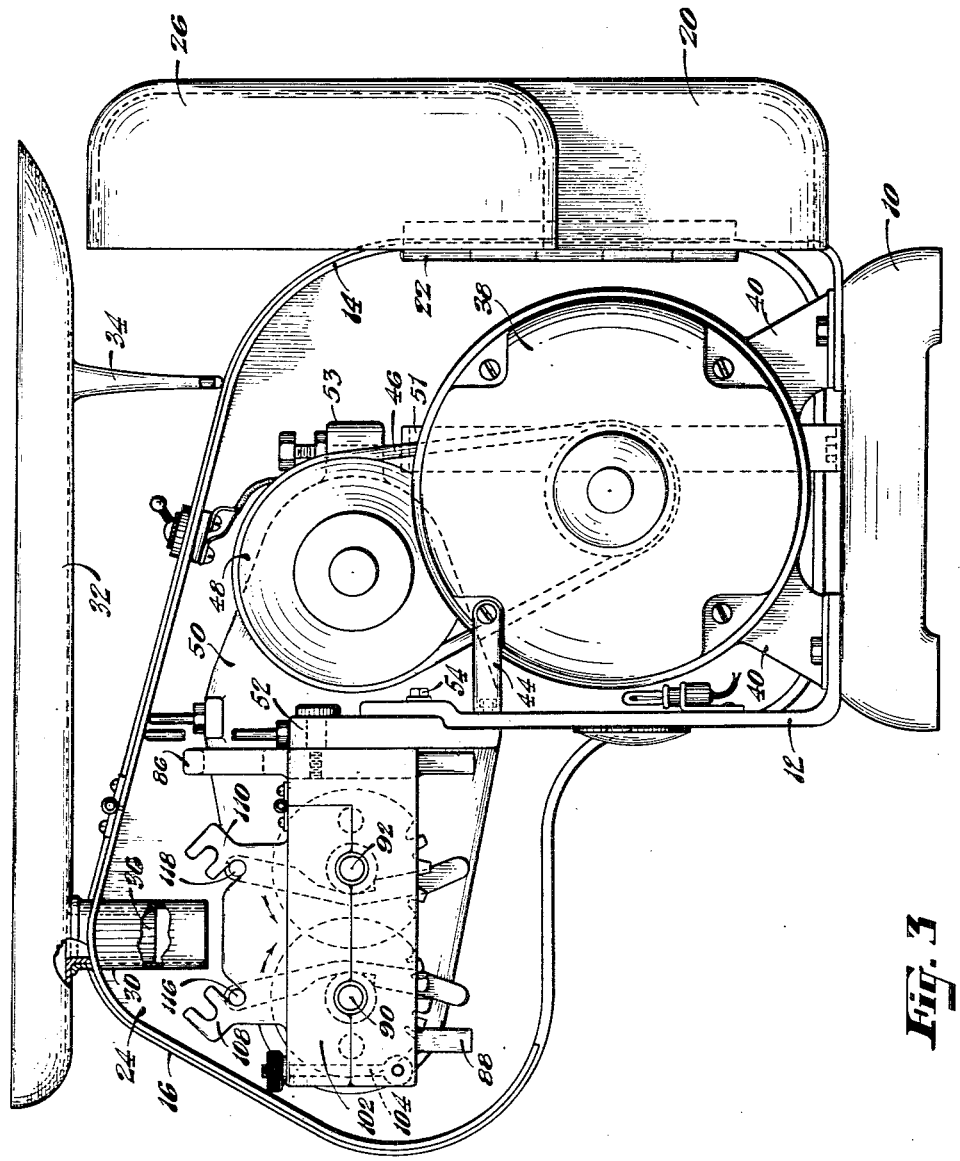

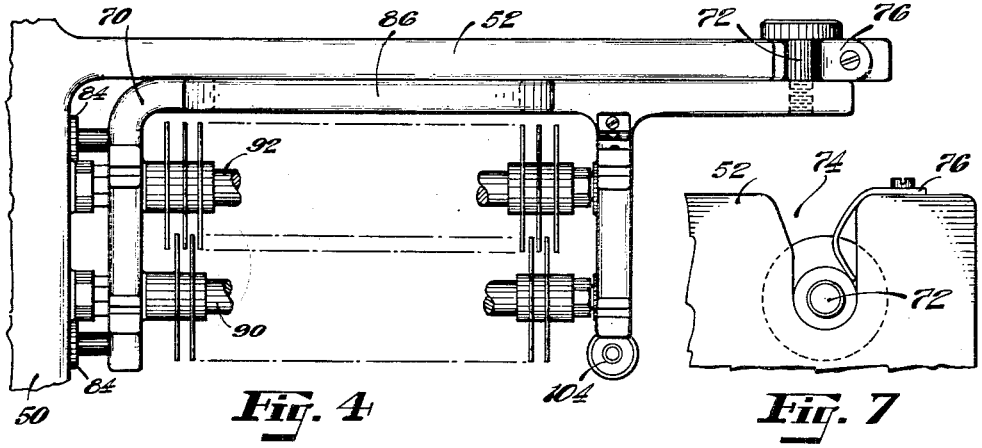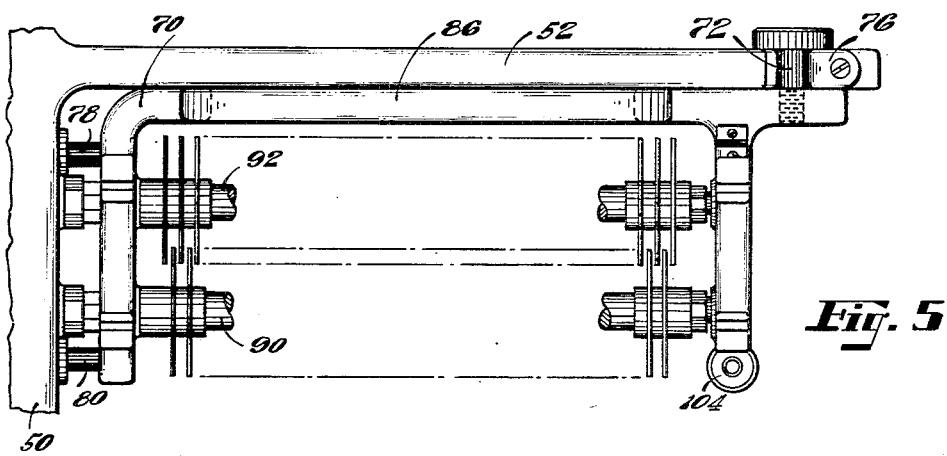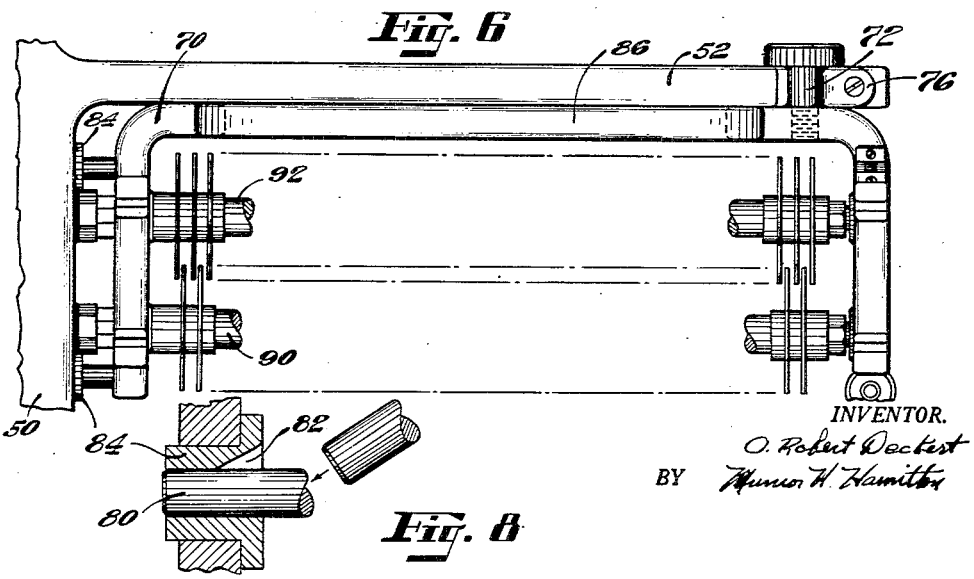

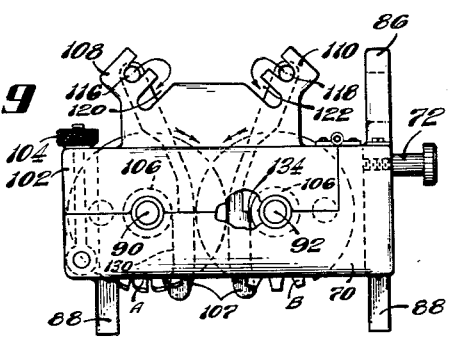

United States Patent Office 2,704,858
Patented Mar. 29, 1955

2,704,858

MEAT TENDERIZING MACHINE WITH COACTING ROLLS

Oscar Robert Deckert, Newtonville, Mass.

Application November 24, 1948, Serial No. 61,798

3 Claims. (Cl. 17—26)

This invention relates to a food processing machine for use in carrying out selective food cutting operations designed to modify and enhance the edibility of foods such as meet, vegetables, and other similar produce. In a preferred embodiment, the invention is exemplified by a selective cutting operation of the sort commonly referred to as "tenderizing" meat in which a piece of meat is passed between a plurality of circular cutting discs so arranged as to come into rolling contact with two opposite sides of the meat and thereby form a multiplicity of closely adjacent slits. The invention is not, however, intended to be limited in its application to meat or any other particular type of food product.

It is a general object of the invention to improve methods and apparatus for processing foods by means of rotary cutting operations of the character indicated. It is also an object to devise an improved form of meat tenderizing machine which is efficient, easily operated and of a special demountable construction enabling an operator to have access instantly to the machine from all sides, thus making it possible to service and clean the operating parts with a minimum amount of time and trouble.

In one more specific aspect, the invention is concerned with the problem of handling and servicing multiple cutter rolls. These cutting members are commonly combined with a frame to provide a unit which may be separately installed and removed and which is often referred to as a basket or "lift-out" member. A procedure which is especially recommended is to remove the lift-out member from the machine and keep it under refrigeration when not in use. Since a considerable amount of stress may be developed in the cutters, it has been the custom to rigidly support the cutting rolls with somewhat cumbersome mechanical fastening means. Such a cutter roll assembly is objectionable in that it requires additional time and effort to take it apart on each occasion the rolls are installed or removed. The need for a "lift-out" cutter mechanism which can be manipulated with a minimum of adjustment has become increasingly apparent, and extends even to mounting of individual cutters and spacers, any one or all of which may from time to time require changing or repair, thus involving a laborious separation of the entire cutter disk assembly.

The food processing machine of the invention furnishes a practical means of satisfying the foregoing objectives by simplifying the construction and arrangement of both the multiple cutter rolls and associated body portions of the machine. In this connection one important feature comprises a novel carrier frame and multiple cutter roll construction in which the frame and rolls are cradled in a bearing member along two adjacent sides of the frame. Supported in this manner the frame can be pivoted into and out of engagement with one end of the bearing to provide for almost instantaneous installation or removal of the frame and cutter unit for cleaning and storage purposes without resorting to any of the more conventional means heretofore employed in securing the cutter unit in an operative position.

The bearing and carrier frame arrangement described has the further virtue of imparting desirable expansibility characteristics to the machine since the carrier frame, owing to its being cradled in the bearing along two adjacent sides only, may conveniently be furnished in varying lengths without change in adjacent bearing structure, and may therefore provide an excellent means of increasing or decreasing the number of cutter discs used in one standard form of machine. An alternative and in some cases a preferable arrangement which becomes possible with the unique frame and bearing construction described, is to make one side of the frame adjustable with respect to an adjacent side and in this way also vary the number of cutter elements employed.

Another important feature of the invention designed especially to facilitate use of the above noted expandable cutter arrangement consists of an improved sectional casing including a cover and two hinged side enclosures, all of which may be thrown back to provide quick access to all parts of the machine and especially to the two ends of the removable carrier frame.

The two side enclosures when fully opened completely uncover two opposite ends of the casing to provide in effect a more or less continuous passageway through which a blast of air may be directed to efficiently clean less accessible parts of the mechanism. In addition the side enclosures are constructed with expanded upper sections which in a closed position are coextensive with the cover and cooperate with it to form an overhanging front side of the casing.

A further feature is an improved stripper design including stripper elements of varying thickness which are adjustably supported in rows so that the rows may be moved toward and away from one another as desired to vary the spacing occurring between them and thus in effect provide for greater or less amounts of pressure as demanded by relatively thick or relatively thin slabs of meat. Another important aspect of the improved stripper design is a scavenger arrangement consisting of recessed edges formed on the rear surfaces of the stripper elements and located in a position to engage against and clean the peripheral surfaces of immediately underlying spacer elements disposed between adjacent cutter elements.

These and other objects and novel features will be more fully understood and appreciated from the following description of a preferred embodiment of the invention selected for purposes of illustration and shown in the accompanying drawings, in which:

Fig. 2 is a front elevational view further illustrating sections of the casing swung open to more fully disclose the multiple cutter rolls;

Fig. 3 is a view in end elevation with one of the casing sides completely swung back through an arc of 90° to illustrate the accessibility characteristics of the machine;

Fig. 4 is a detail plan view of a bearing and frame structure more clearly indicating the manner in which the multiple cutting rolls are supported;

Figs. 5 and 6 are similar detail plan views illustrating expanded forms of the frame and supporting structure in which varying lengths of multiple cutter rolls are employed;

Fig. 7 is a detail cross-sectional view indicating a locking arrangement for securing one end of the frame in the bearing;

Fig. 8 is a detail view of pin means for pivotally securing an opposite end of the frame in oversize openings in the bearing member;

Fig. 9 is an end elevational view of the multiple cutting rolls and supporting frame further illustrating improved stripper elements arranged in a scavenging position;

Fig. 10 is a detail view illustrating another position of a stripper element on a spacer member;

Fig. 11 is a perspective view of the improved stripper element of Figs. 9 and 10 as viewed from the rear;

Fig. 12 is a side elevational view of an improved disc cutting element;

Fig. 13 is an elevational view of another form of cutting element employed in the machine of the invention;

Figs. 14 and 16 are views illustrating another form of stripper element;

Fig. 15 is a fragmentary plan view diagrammatically indicating a specific arrangement of two different types of multiple cutter discs occurring in intervening relation with respect to one another as shown.

Figure 1:
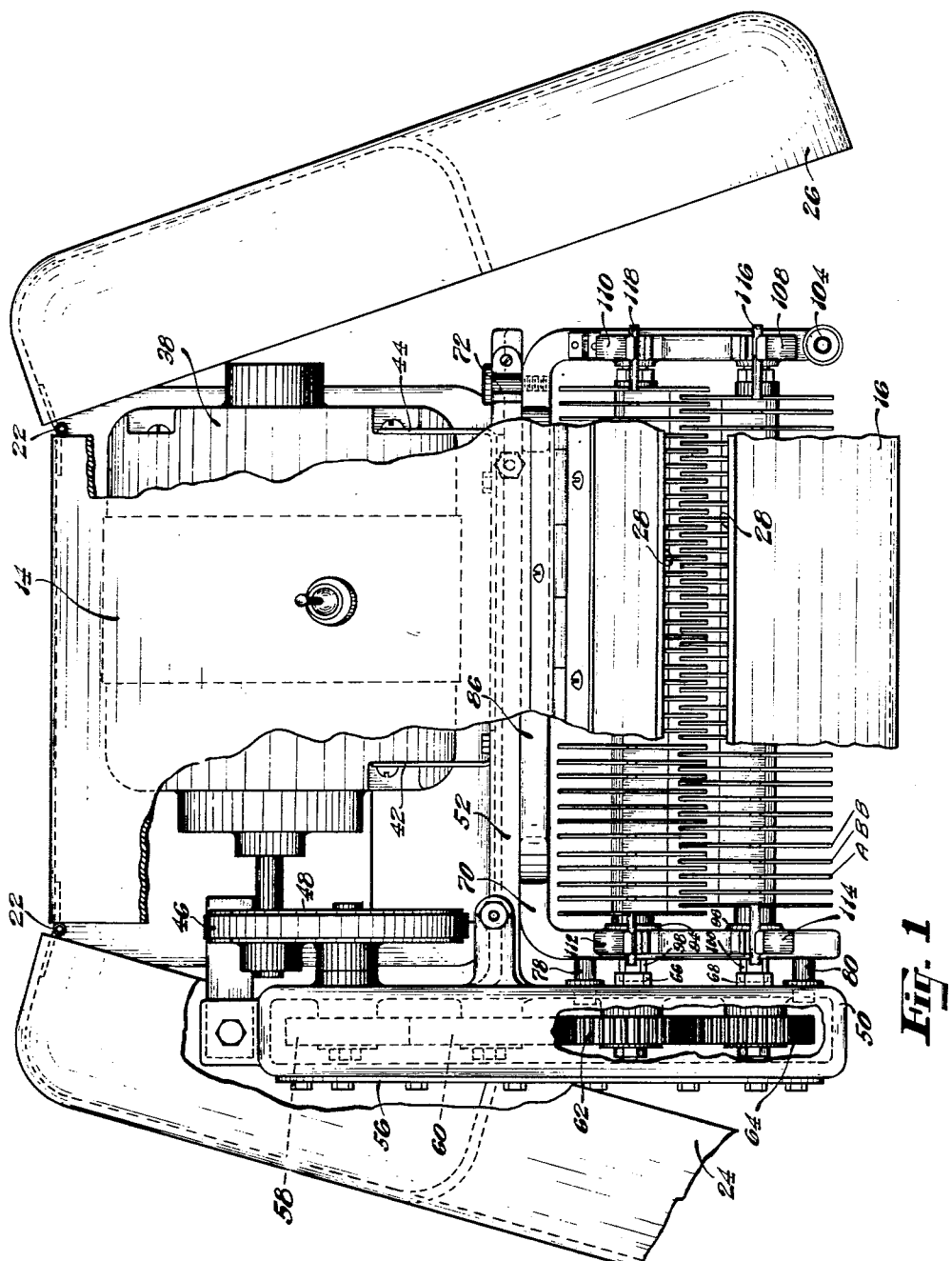
Fig. 1 is a plan view illustrating the food processing machine of the invention with sections of the casing swung outwardly and portions of the top and cover broken away to disclose a pair of multiple disc cutters and supporting and driving means for these members.

Generally speaking the principal parts of the machine include a casing, and a pair of multiple cutting rolls together with mechanism for receiving and driving the cutting rolls, and this structure will be described with reference to tenderizing meat as one preferred application of the invention, having in mind especially facilities for processing two or more small portions of meat so that the small pieces may be interwoven and firmly pressed together to form a more nearly standard size slice of meat.

Thus in the structure shown in Figs. 1, 2 and 3, numeral 10 indicates a base or pedestal on which is supported a vertical front panel 12 and a rear panel 14, which extends upwardly and then forwardly above and across the front panel to form a curved top section as shown in Fig. 3. Included in the top section is a cover 16 hinged to the front margin of the panel 14 and having an elongated slot 28 through which meat to be processed may be introduced into the machine. The front and rear panels, together with the base, form a central section of a casing open at two opposite sides to form a chamber which is highly accessible from either of the sides for installing and servicing mechanism and which in effect presents a continuous passageway through which air or other cleaning agency may be introduced to clean the contained mechanism.

The two openings are normally closed by a pair of side enclosures 18 and 20 which are secured in some convenient manner as by hinges 22. At their upper front sides the enclosures are formed with forwardly extending portions 24 and 26 of an irregular contour which in a closed position of the enclosures is coextensive with the contour of the cover 16. The side enclosures therefore cooperate with the cover 16 to constitute a front side of the casing which is disposed forwardly of and overhangs the panel 12 throughout a substantial distance and which presents at its underneath side an aperture through which processed meat may be expelled and received in a container directly beneath the cutter rolls.

The elongated slot 28 communicates with a tubular guide 30 projecting downwardly for a short distance below the casing top in register with the cutter rolls directly below, as suggested in Fig. 3. Mounted above the casing is a loading tray 32 for receiving material to be processed and holding it in a convenient loading position. The tray may for example be supported at one end by legs 34 which bear on the panel 14 and at an opposite end by a tubular neck 36 which is designed to readily engage with and pass into the guide 30, thereby forming a continuous passageway from the tray into the machine for feeding pieces of meat to the cutter rolls.

Mounted between the panels 12 and 14 on the base 10 is an electric motor 38, secured by standards 40, which are bolted to the base as shown in Fig. 3. The motor is also supported transversely of the casing by means of reinforcing straps 42 and 44. Motor 38, through a belt 46, drives a pulley 48 which is rotatably mounted in an extension 50 of a transverse bearing member 52 solidly secured along the upper side of the panel 12 as shown in Figs. 1 and 2, by means of fastenings 54. The bearing 52 preferably consists of a metal casting with the extension 50 being recessed to provide an open gear housing which is normally closed by a cover 56. Located within the housing is a series of gears 58, 60, 62 and 64, driven by the pulley 48 as illustrated in Fig. 1. The gears 62 and 64 actuate hexagonal drivers 66 and 68, rotatably mounted through the bearing extension 50 as shown.

The panel 12 is sufficiently flexible to permit a slight rocking of the gear housing 50 toward and from the motor. Means including a post 51 mounted on the base 10 and connected at its top end to the housing at 53 is provided for steadying the housing and adjusting it to a position giving desired driving tension to the belt 46.

An interesting aspect of the bearing extension 50 is its arrangement substantially at right angles to the main body of the bearing 52 so that the bearing presents a T-shaped projecting portion defining an angular enclosure. Within this angular enclosure is adjustably supported a U-shaped carrier frame 70, which includes two relatively short legs and a relatively long connecting portion for the legs. The connecting portion referred to is snugly fitted against one side of the bearing 52, as suggested in Fig. 1, and is provided with a stud 72, preferably threaded transversely therein. The stud 72 is arranged to engage in a slot 74 (Fig. 7) formed in the upper surface of bearing 52 and thus support one end of the U-shaped frame. A curved spring 76 is secured in a vertical position in the slot 74 at one side thereof to releasably lock the stud in place in response to a light downward pressure. The opposite end of the frame 70 is supported at two other points by means of pins 78 and 80 fixed therein and adapted to engage in oversize openings 82 in a pair of bearing sleeve members 84 received through the bearing extension 50 (Fig. 1). By virtue of the arrangement described, it will be seen that the carrier frame is cradled in the bearing 52 and its extension 50, and the frame end carrying the stud 72 is free to be lifted upwardly to assume an inclined position with the pins 78 and 80 becoming disposed at an angle in the elongated openings 52 of the bearing sleeve 84. In this relative position the frame is readily disengaged from the hexagonal drivers. A handle 86 provides a convenient means of grasping and lifting out the frame in the manner described, and at the underneath side of the frame are provided legs 88 on which the frame may rest when placed in a refrigerator or otherwise stored.

Journaled within the two opposite ends of carrier frame 70 are a pair of multiple cutter rolls 90 and 92. At the frame end nearest the hexagonal drivers 66 and 68 the rolls 90 and 92 are received in bearing sleeves 94 and 96 and present hexagonal extremities 98, 100, adapted to slidably engage in the drivers 66 and 68 as shown in Fig. 1. The opposite ends of rolls 90 and 92 are removably supported in the frame between a lower section thereof and a hinged upper section 102 adjustably secured by means of a pivoted locking member 104 (Fig. 3). Thus the disengageable driving connections at 66 and 68 cooperate with the studs 78 and 80 to support one end of the frame 70, the other end being supported by the stud 72.

Arranged on the two rolls 90 and 92 in alternating succession, as shown in Fig. 1, are two rows of disc cutters and circular spacers. The spacers are denoted by numeral 106 and are of the same general character in each of the two rows. In the case of the disc cutters however there are preferably employed two different types, one of which is indicated by the letter A and the other by the letter B. These two types of cutters are more clearly shown in Figs. 12, 13 and 15, from an inspection of which it will be noted that the A type of cutter shown in Fig. 12 is of novel character while the B type cutter represents a standard form of cutter commonly used in the trade. The improved characteristics of the A type cutter are centered about the teeth elements C, each of which is separated by a radial slot D and further formed with a curved draw cut edge E. Each draw cut edge E extends from the outer periphery of the disc cutter around into the bottom of a respective slot occurring at the forward side of the tooth of which it is a part.

It is found that in connection with the operation of forcing small portions against the radial slots of disc cutters, a part of the meat is extruded down into the bottom of the radial slots. In the case of conventional draw cut disc cutters, as the teeth rotate they move away from the extruded meat portions without effecting a complete cutting action with respect to the extruded meat portion. It is pointed out that such an incomplete cutting action is avoided by the cutting edge construction of the invention since the extended curved cutting edge E of each tooth C lies in a position to render a continuous cut along all portions of meat which are pressed downwardly into the intervening slot. When a tooth rotates the extended curved edge E is drawn across the extruded portion of meat as it is pulled out of the slot.

In Fig. 15 there has been illustrated a novel arrangement of cutters, including cutters of the B type such as shown in Fig. 13, and a draw cut type of cutter such as is illustrated especially by the type A cutter, although not necessarily limited to this specific type of draw cut element. It is pointed out that the type B cutter is formed with tapering teeth and functions somewhat differently than a draw cut element since a more limited cutting action takes place and the meat is partly pierced or skewered rather than sliced. When type B cutters are used with a plurality of pieces of meat, the result is to produce a weaving together of adjacent meat portions.

In the cutter arrangement shown in Fig. 15, the respective functioning of both A type and B type cutters is made use of in such a way as to greatly alter the effect produced by two rows of intervening cutters. Attention is first directed to the upper rows of cutters occurring in Fig. 15 wherein it will be noted that the A type cutters are located in a sequence such that there will always be two B type cutters at either side thereof. Referring now to the lower row of cutters in Fig. 15, it will be observed that the same general sequence is followed but an A type cutter of the upper row is arranged to intervene between two B type cutters of the lower roll, while each of the two B type cutters referred to are in turn caused to lie between an A cutter and a B cutter. As a result, each portion of meat which is contacted by a draw cut element is subjected to a weaving action on either side of the draw cut element by means for four opposed B type cutters. The principal advantage derived from this specific cutter pattern described is in connection with processing two or more pieces of meat. There is produced a relatively thick slice of meat in which the pieces are intimately interwoven and pressed together to a degree not heretofore realized and at the same time each draw cut is substantially elongated to provide for a greater tenderizing effect.

As is usual in machines of the character described, a series of stripper elements 107 arranged in two opposite rows are suspended above the cutter rolls 92 and 94, in a position to occupy the spaces between adjacent cutters. In accordance with the invention, however, both the stripper design and the means for supporting the stripper elements have been improved as is disclosed in Figs. 3 and 9. In the figures noted, it will be seen that the frame 70 is provided at either end thereof with two pairs of arms 108 and 110, 112 and 114, the latter two of which are shown in Fig. 1. The arms extend upwardly and outwardly well beyond the axes of the two rolls 90 and 92 to support two transverse stripper bars 116 and 118 in an inclined position in which each stripper element bears against a spacer as suggested in dotted lines in Fig. 9. In this position the strippers of respective rows present a substantially uniform spaced-apart relation to constitute a guideway for receiving and passing pieces of meat between the cutters. In this structure means are provided for varying the spacing between the rows by forming strippers of varying width and adjustably supporting them in rows so that each row can be raised or lowered and in so doing approach or move away from one another.

As illustrative of one preferred embodiment of such a stripper arrangement, the arms 108, 110, 112 and 114 may be provided with an additional pair of stripper roll supporting slots as 120 and 122, as indicated in Fig. 9. As will be noted from an inspection of the stripper element 107 shown in Fig. 11, this member along the edge 130 which normally lies nearest to its spacer has been relieved to provide a recessed face 132, with the result that the width of the stripper along its mid-section is materially decreased.

Assuming that the relative position of a stripper when supported in the uppermost set of slots is such as to cause the edge 130 to bear on a spacer, it will readily be seen that by lowering the stripper into the position it assumes when supported in the second set of slots as 120, 122, the recessed edge 132 comes to bear on the spacer and in so doing moves outwardly a substantial distance. In the case of two rows of strippers, there will thus be secured a considerable increase in the spacing between them. This adjustment materially aids the stripper mechanism to properly support meat as it passes through the cutters especially when varying thicknesses of meat are encountered and thus secure a maximum amount of cutting and weaving together of the meat portions.

When formed in the manner shown in Fig. 11, the improved stripper design of the invention offers still another novel function consisting of the scavenging or cleaning function noted at an earlier point in the specification and dealing with the spacers 106. It will be observed that the recessed edge 132 terminates abruptly to form a sharp shouldered portion which constitutes a scavenging edge 134. This edge may conveniently be adjusted to come into contact with the peripheral surface of its respective underlying spacer in the manner suggested in Fig. 9 and in this position the edge maintains the spacers in a cleanly scraped condition, thus preventing the accumulation of small bits of meat at these inaccessible points. If desired, the stripper design may be altered as illustrated in Figs. 14, 16, in which is shown a stripper element 136 having a plurality of cleaning or scavenging edges 138 arranged to come into contact with an adjacent spacer surface at varying angles.

The strippers further provide a secondary scavenging effect on the sides of adjacent disc cutters. The scavenging action is obtained by employing a stripper member of square cross section instead of round wire cross sections heretofore used. It will be readily seen that these square edges can be directed as scrapers along the cutter disc sides and prevent accumulation of particles of meat or dirt.

In a similar manner to the foregoing procedure for handling pieces of meat, it may also be desired to utilize the machine for cutting foods such as raw vegetables and combining small portions of various substances intimately together to form novel food products such as salads and other preparations. In this connection, the form of the cutter rolls, including the disc cutters and the stripper members, may be modified in various respects in keeping with the scope of the invention as defined by the appended claims.

Having thus disclosed my invention and described in detail illustrative embodiments thereof, I claim as new and desire to secure by Letters Patent:

1. A meat tenderizing machine comprising a base, a motor on the base, a panel extending vertically from the base, a T-shaped bearing member supported at the upper portion of the panel and extending horizontally thereacross, a gear box mounted on one end of the bearing member above the motor, gearing in the box, a driving belt connecting the motor and the gearing, a pair of rotary cutters supported by said bearing and extending laterally of the panel, and drive means operatively connecting said motor, said gearing and said cutters.

2. A machine of the kind described in claim 1 with means between the gearing and the base for adjusting the tension on the belt.

3. A machine of the kind described in claim 1 wherein there is provided a rear panel mounted on said base and pivoted side enclosures mounted on said rear panel.

References Cited in the file of this patent

UNITED STATES PATENTS

| Number | Name | Date |
|---|---|---|
| 2,006,106 | Markert | June 25, 1935 |
| 2,007,464 | Wood | July 9, 1935 |
| 2,163,123 | Huse | June 20, 1939 |
| 2,346,686 | Jackson | Apr. 18, 1944 |
| 2,360,729 | Spang | Oct. 17, 1944 |
| 2,409,463 | Ahrndt | Oct. 15, 1946 |
| 2,457,622 | Ahrndt | Dec. 28, 1948 |
| 2,472,800 | Ahrndt | June 14, 1949 |
| 2,497,038 | Spang | Feb. 7, 1950 |
| 2,531,105 | Brown | Nov. 21, 1950 |
| 2,561,867 | Jackson | July 24, 1951 |
| 2,607,952 | McIntosh | Aug. 26, 1952 |